(12) United States Patent
Do et al.

(10) Patent No.: US 9,683,061 B2
(45) Date of Patent: Jun. 20, 2017

(54) CATALYST COMPOSITION AND METHOD OF PREPARING POLYMER INCLUDING THE SAME

(71) Applicant: LG CHEM, LTD., Seoul (KR)

(72) Inventors: Young Shil Do, Daejeon (KR); Seung Hwan Jung, Daejeon (KR); Yoon Hee Cho, Daejeon (KR); Yun Jin Lee, Daejeon (KR); Choong Hoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/762,911

(22) PCT Filed: Sep. 25, 2014

(86) PCT No.: PCT/KR2014/008985
§ 371 (c)(1),
(2) Date: Jul. 23, 2015

(87) PCT Pub. No.: WO2015/046930
PCT Pub. Date: Apr. 2, 2015

(65) Prior Publication Data
US 2015/0361196 A1  Dec. 17, 2015

(30) Foreign Application Priority Data

Sep. 26, 2013 (KR) .................. 10-2013-0114253
Aug. 11, 2014 (KR) .................. 10-2014-0104007

(51) Int. Cl.
| | | |
|---|---|---|
| C08F 4/6592 | (2006.01) | |
| C08F 210/16 | (2006.01) | |
| C08F 110/14 | (2006.01) | |
| C08F 10/00 | (2006.01) | |
| C08F 4/659 | (2006.01) | |

(52) U.S. Cl.
CPC .......... *C08F 110/14* (2013.01); *C08F 4/6592* (2013.01); *C08F 10/00* (2013.01); *C08F 4/65908* (2013.01); *C08F 4/65916* (2013.01); *C08F 210/16* (2013.01); *C08F 2420/02* (2013.01); *C08F 2420/06* (2013.01)

(58) Field of Classification Search
CPC  C08F 4/6592; C08F 4/65908; C08F 4/95912; C08F 10/00
See application file for complete search history.

(56) References Cited

U.S. PATENT DOCUMENTS

| | | |
|---|---|---|
| 5,064,802 A | 11/1991 | Stevens et al. |
| 5,539,076 A | 7/1996 | Nowlin et al. |
| 6,214,953 B1 | 4/2001 | Oh et al. |
| 6,548,686 B2 | 4/2003 | Nabika et al. |
| 6,576,723 B1 | 6/2003 | Bohnen et al. |
| 7,504,354 B2 | 3/2009 | Elder et al. |
| 9,096,575 B2 | 8/2015 | Lee et al. |
| 2005/0054791 A1 | 3/2005 | Nowlin et al. |
| 2007/0225158 A1 | 9/2007 | Lee et al. |
| 2008/0021183 A1 | 1/2008 | Graham et al. |
| 2010/0062927 A1 | 3/2010 | Lee et al. |
| 2010/0087609 A1 | 4/2010 | Park et al. |
| 2010/0093959 A1 | 4/2010 | Hong et al. |
| 2010/0121006 A1 | 5/2010 | Cho et al. |
| 2011/0086990 A1 | 4/2011 | Graham et al. |
| 2011/0152529 A1 | 6/2011 | Lee et al. |
| 2011/0160413 A1 | 6/2011 | Lee et al. |
| 2011/0172451 A1 | 7/2011 | Lee et al. |
| 2011/0177935 A1 | 7/2011 | Lee et al. |
| 2013/0203949 A1 | 8/2013 | Lee et al. |
| 2013/0211020 A1 | 8/2013 | Lee et al. |
| 2013/0211021 A1 | 8/2013 | Lee et al. |
| 2013/0211023 A1 | 8/2013 | Lee |
| 2013/0211024 A1 | 8/2013 | Lee et al. |
| 2013/0296497 A1 | 11/2013 | Jeong et al. |
| 2015/0011770 A1 | 1/2015 | Lee et al. |

FOREIGN PATENT DOCUMENTS

| | | |
|---|---|---|
| CN | 1227570 A | 9/1999 |
| CN | 101213218 A | 7/2008 |
| CN | 101296932 A | 10/2008 |
| CN | 102834402 A | 12/2012 |
| EP | 2 559 695 A2 | 2/2013 |
| EP | 2 873 671 A1 | 5/2015 |
| JP | 2002-516358 A | 6/2002 |
| JP | 2003-201308 A | 7/2003 |
| JP | 2010-514836 A | 5/2010 |
| JP | 2010-526203 A | 7/2010 |
| JP | 2013-527271 A | 6/2013 |
| KR | 10-2001-0020425 A | 3/2001 |
| KR | 10-2005-0035183 A | 4/2005 |
| KR | 10-2007-0096465 A | 10/2007 |
| KR | 10-0820542 B1 | 4/2008 |
| KR | 10-2008-0049981 A | 6/2008 |
| KR | 10-2008-0065868 A | 7/2008 |
| KR | 10-2008-0097019 A | 11/2008 |

(Continued)

OTHER PUBLICATIONS

Extended European Search Report for European Application No. 14812388.8, dated Sep. 1, 2015.
International Search Report, dated Dec. 23, 2014, for International Application No. PCT/KR2014/008986.
Kim et al., "Preparation of Thiophene-Fused and Tetrahydroquinoline-Linked Cyclopentadienyl Titanium Complexes for Ethylene/α-Olefin Copolymerization", Catalysts, 2013, vol. 3, pp. 104-124.
McDonagh et al., "Organometallic complexes for nonlinear optics Part 21. Syntheses and quadratic hyperpolarizabilities of alkynyl complexes containing optically active 1,2-bis(methylphenylphosphino) benzene ligands", Journal of Organometallic Chemistry, 2000, vol. 610, pp. 71-79.

(Continued)

*Primary Examiner* — Caixia Lu
(74) *Attorney, Agent, or Firm* — Birch, Stewart, Kolasch & Birch, LLP

(57) ABSTRACT

The present invention relates to a catalyst composition and a method of preparing a polymer including the same.

13 Claims, No Drawings

(56) References Cited

FOREIGN PATENT DOCUMENTS

| KR | 10-2008-0101542 A | 11/2008 |
|---|---|---|
| KR | 10-0964093 B1 | 6/2010 |
| KR | 10-1175338 B1 | 6/2010 |
| KR | 10-2010-0083076 A | 7/2010 |
| KR | 10-0986301 B1 | 10/2010 |
| KR | 10-2012-0024427 A | 3/2012 |
| KR | 10-1299375 B1 | 8/2013 |
| WO | WO 2015/046930 A1 | 4/2015 |
| WO | WO 2015/046931 A1 | 4/2015 |
| WO | WO 2015/046932 A1 | 4/2015 |

OTHER PUBLICATIONS

Chinese Office Action and Search Report dated Feb. 23, 2016, for Chinese Application No. 201480001887.4 with the English translation of the Office Action.

Chen et al., "A Nove Phenolate "Constrained Geometry" Catalyst System. Efficient Synthesis, Structural Characterization, and αOlefin Polymerization Catalysis", Organometallics, 1997. vol. 16, pp. 5958-5963.

Christie et al., "Novel Routes to Bidenate Cyclopentadienyl-Alkoxide Complexes of Titanium: Synthesis of ($\eta^5\sigma$-$C_5R^1{}_4CHR^2CH_2CR^3R^4O)TiCl_2$", Organmetallics, 1999, vol. 18, pp. 348-359.

Gibson et al., "Advances in Non-Metallocene Olefin Polymerization Catalysis", Chemical Reviews, 2003, vol. 103, pp. 283-315.

Gielens et al., "Titanium Hydrocarbyl Complexes with a Linked Cyclopentadienyl-Alkoxide Ancillary Ligand; Participation of the Ligand in an Unusual Activation of a (Trimethylsilyl)methyl Group", Organometallics, 1998, vol. 17, pp. 1652-1654.

International Search Report, issued in PCT/KR2014/008985, mailed Dec. 26, 2014.

Nayab et al., "Synthesis and characterization of novel tungsten complexes and their activity in the ROMP of cyclic olefins", Polyhedron, 2012, vol. 42, pp. 102-109.

Rau et al., "Synthesis and application in high-pressure polymerization of a titanium complex with a linked cyclopentadienyl-phenoxide ligand", Journal of Organometallic Chemistry, 2000, vol. 608, pp. 71-75.

Turner et al., "Facile resolution of constrained geometry indenyl-phenoxide ligation", Chemical Communications, 2003, pp. 1034-1035.

Zhang et al., "Constrained Geometry Tetramethylcyclopentadienyl-phenoxytitanium Dichlorides: Template Synthesis, Structures, and Catalytic Properties for Ethylene Polymerization", Organometallics, 2004, vol. 23, pp. 540-546.

CATALYST COMPOSITION AND METHOD OF PREPARING POLYMER INCLUDING THE SAME

TECHNICAL FIELD

The present invention relates to a catalyst composition and a method of preparing a polymer including the same.

BACKGROUND ART

[Me$_2$Si(Me$_4$C$_5$)NtBu]TiCl$_2$ (Constrained-Geometry Catalyst, hereinafter, will be abbreviated as CGC) was reported by Dow Co. in the early 1990s (U.S. Pat. No. 5,064,802), and excellent aspects of the CGC in the copolymerization reaction of ethylene and alpha-olefin may be summarized in the following two points when compared to commonly known metallocene catalysts: (1) At a high polymerization temperature, high activity is shown and a polymer having high molecular weight is produced, and (2) the copolymerization degree of alpha-olefin having large steric hindrance such as 1-hexene and 1-octene is excellent. In addition, as various properties of the CGC during performing a polymerization reaction are gradually known, efforts of synthesizing the derivatives thereof and using as a polymerization catalyst has been actively conducted in academy and industry.

As one approach, the synthesis of a metal compound introducing various bridges instead of a silicon bridge and a nitrogen substituent and the polymerization thereof has been conducted. Typical metal compounds known until now are illustrated as the following Compounds (1) to (4) (Chem. Rev. 2003, 103, 283).

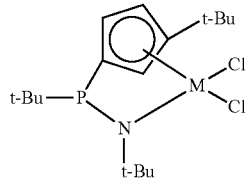
(1)

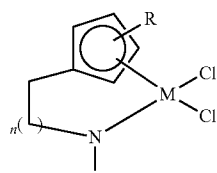
(2)

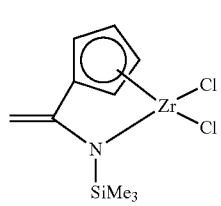
(3)

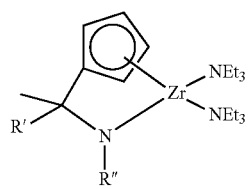
(4)

The above Compounds (1) to (4) introduce a phosphorous bridge (1), an ethylene or propylene bridge (2), a methylidene bridge (3) or a methylene bridge (4) instead of the silicon bridge of a CGC structure. However, improved results on activity, copolymerization performance, etc. could not be obtained by applying an ethylene polymerization or a copolymerization with alpha-olefin when compared to those obtained by applying the CGC.

As another approach, a compound composed of an oxido ligand instead of the amido ligand of the CGC has been synthesized a lot, and an attempt on the polymerization using thereof has been conducted to some extent. Examples thereof are summarized in the following.

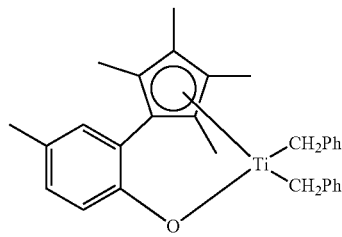
(5)

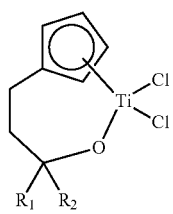
(6)

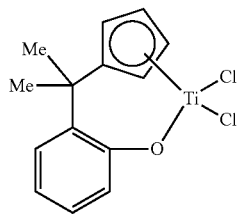
(7)

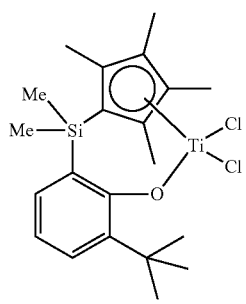
(8)

Compound (5) has been reported by T. J. Marks et al. and is characterized in that a cyclopentadiene (Cp) derivative and an oxido ligand are bridged via an ortho-phenylene group (Organometallics 1997, 16, 5958). A compound having the same bridged group and a polymerization using thereof have been reported by Mu et al. (Organometallics 2004, 23, 540). In addition, the bridging of an indenyl ligand and an oxido ligand by the same ortho-phenylene group has been reported by Rothwell et al. (Chem. Commun. 2003, 1034). Compound (6) has been reported by Whitby et al. and is characterized in that a cyclopentadienyl ligand and an oxido ligand are bridged by three carbon atoms (Organometallics 1999, 18, 348). The above catalysts have been reported to show activity in a syndiotactic polystyrene polymerization. Similar compounds have been also reported by Hessen et al. (Organometallics 1998, 17, 1652). Compound (7) has been reported by Rau et al. and is characterized in showing activity in an ethylene polymerization and an ethylene/1-hexene copolymerization at a high temperature and high pressure (210° C., 150 MPa) (J. Organomet. Chem. 2000, 608, 71). In addition, the synthesis of a catalyst (8) having similar structure as that of Compound (7) and a polymerization using the same at high temperature and high pressure have been filed by Sumitomo Co. (U.S. Pat. No. 6,548,686). However, not many catalysts among the above attempts are practically applied in commercial plants. Accordingly, a catalyst showing further improved polymerization performance is required, and a simple preparation method of the catalysts is required.

PRIOR ART DOCUMENTS

Patent Documents

U.S. Pat. No. 5,064,802
U.S. Pat. No. 6,548,686

Non-Patent Documents

Chem. Rev. 2003, 103, 283
Organometallics 1997, 16, 5958
Organometallics 2004, 23, 540
Chem. Commun. 2003, 1034
Organometallics 1999, 18, 348
Organometallics 1998, 17, 1652
J. Organomet. Chem. 2000, 608, 71

DISCLOSURE OF THE INVENTION

Technical Problem

In the present invention, a catalyst composition and a method of preparing a polymer using the same are provided.

Technical Solution

According to an aspect of the present invention, there is provided a catalyst composition including a cis isomer and a trans isomer of a transition metal compound, wherein the cis isomer (c) and the trans isomer (t) of the transition metal compound is selected in an amount range by weight (c:t) of 1-99:99-1.

According to another aspect of the present invention, there is provided a method of preparing a polymer using the above-described catalyst composition.

Advantageous Effects

In the catalyst composition according to the present invention, the site around a metal has a rigid pentagonal structure and is maintained very stably due to an amido group connected to a phenylene bridge, and thus structurally, the approach of monomers may be very easy.

Accordingly, a polymer having narrow molecular weight distribution (hereinafter, will be abbreviated as MWD) with respect to CGC, good copolymerization properties and high molecular weight in a low density region may be prepared by using the catalyst composition including the transition metal compound.

MODE FOR CARRYING OUT THE INVENTION

According to an embodiment of the present application, a catalyst composition including a cis isomer and a trans isomer of a transition metal compound, wherein the cis isomer (c) and the trans isomer (t) of the transition metal compound are selected in an amount range by weight (c:t) of 1-99:99-1, is provided.

According to another embodiment of the present application, a catalyst composition including the cis isomer and the trans isomer of the transition metal compound, wherein the weight ratio of the cis isomer (c) and the trans isomer (t) of the transition metal compound is selected in a range of 1-49:99-51, or 51-99:49-1, is provided.

According to further another embodiment of the present application, a catalyst composition including the cis isomer and the trans isomer of the transition metal compound, wherein the weight ratio of the cis isomer (c) and the trans isomer (t) of the transition metal compound is 50:50, is provided.

In the present invention, the amounts of the cis isomer and the trans isomer of the transition metal compound may be obtained by using $^1$H-NMR.

According to an embodiment of the present application, the transition metal compound may be a transition metal compound represented by the following Formula 1.

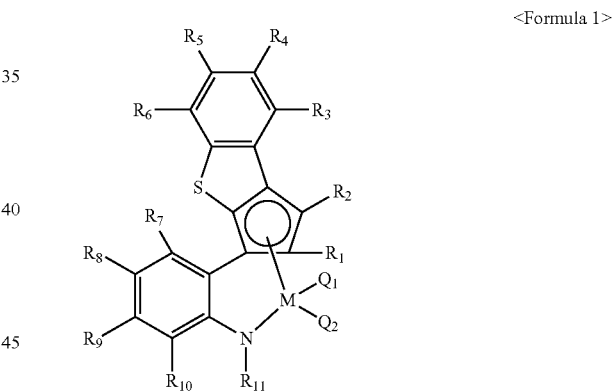

<Formula 1> in the above Formula 1,

M is a transition metal in group 4, $Q_1$ and $Q_2$ are the same or different and independently hydrogen; halogen; alkyl having 1 to 20 carbon atoms; alkenyl having 2 to 20 carbon atoms; aryl having 6 to 20 carbon atoms; alkylaryl having 6 to 20 carbon atoms; arylalkyl having 7 to 20 carbon atoms; alkyl amido having 1 to 20 carbon atoms; aryl amido having 6 to 20 carbon atoms; or alkylidene having 1 to 20 carbon atoms, $R_1$ to $R_6$ are the same or different and independently hydrogen; silyl; alkyl having 1 to 20 carbon atoms; alkenyl having 2 to 20 carbon atoms; aryl having 6 to 20 carbon atoms; alkylaryl having 7 to 20 carbon atoms; arylalkyl having 7 to 20 carbon atoms; or a metalloid radical of a metal in group 14 substituted with hydrocarbyl having 1 to 20 carbon atoms; $R_1$ and $R_2$ may be connected from each other, or at least two of $R_3$ to $R_6$ may be connected to each other to form an aliphatic ring having 5 to 20 carbon atoms or an aromatic ring having 6 to 20 carbon atoms; the aliphatic ring or the aromatic ring may be substituted with halogen, alkyl having 1 to 20 carbon atoms, alkenyl having 2 to 20 carbon atoms or aryl having 6 to 20 carbon atoms, and $R_7$ to $R_{11}$ are the same or different and independently hydrogen; alkyl having 1 to 20 carbon atoms; alkenyl having 2 to 20 carbon atoms; aryl having 6 to 20 carbon atoms; alkylaryl having 7 to 20 carbon atoms; or arylalkyl having 7 to 20 carbon atoms; at least two adjacent to each other of $R_7$ to $R_{11}$ may be connected to each other to form an aliphatic ring having 5 to 20 carbon atoms or an aromatic ring having 6 to 20 carbon atoms; the aliphatic ring or the aromatic ring may be substituted with halogen, alkyl having 1 to 20 carbon atoms, alkenyl having 2 to 20 carbon atoms or aryl having 6 to 20 carbon atoms.

$R_1$ to $R_{11}$ may be independently unsubstituted or substituted, and for the substituted $R_1$ to $R_{11}$, a substituent may be halogen, alkyl having 1 to 20 carbon atoms, hydrocarbyl having 1 to 20 carbon atoms, alkoxy having 1 to 20 carbon atoms or aryloxy having 6 to 20 carbon atoms.

In the transition metal compound of the above Formula 1 described in the present application, a metal site is connected to a cyclopentadienyl ligand connected to a phenylene bridge introducing an amido group, and the structure thereof has a narrow Cp-M-N angle and a wide $Q_1$-M-$Q_2$ angle to which a monomer may approach. In addition, different from a CGC structure connected by a silicon bridge, the sites of cyclopentadiene fused with benzothiophene via the bonding of a ring shape, the phenylene bridge, nitrogen and the metal are connected in order to form a stable and rigid pentagonal ring structure in the compound structure represented by the above Formula 1.

Thus, when applying these compounds for the polymerization of olefin after reacting with a cocatalyst such as methyl aluminoxane or $B(C_6F_5)_3$ and activating, polyolefin having high activity, high molecular weight and high copolymerization degree may be produced even at a high polymerization temperature. Particularly, since a large amount of alpha-olefin may be introduced as well as linear polyethylene having a low density of 0.910-0.930 g/cc due to the structural characteristics of the catalyst, a polyolefin copolymer having extremely low density of less than 0.910 g/cc may be produced.

In particular, a polymer having narrow molecular weight distribution (MWD), good copolymerization degree and high molecular weight in a low density region may be prepared by using a catalyst composition including the transition metal compound.

In addition, diverse substituents may be introduced in a cyclopentadienyl group fused with benzothiophene and quinolines, and electronic and steric environment around a metal may be easily controlled, and so, the structure and physical properties of the polyolefin thus produced may be controlled. The compound of the above Formula 1 may be preferably used for preparing a catalyst for polymerizing an olefin monomer, however the present invention is not limited thereto. The transition metal compound may be used in any other applicable fields.

According to another embodiment of the present application, $R_7$ to $R_{10}$ are hydrogen.

According to another embodiment of the present application, $R_{11}$ may be unsubstituted or substituted alkyl having 1 to 20 carbon atoms, aryl having 6 to 20 carbon atoms or alkylaryl having 7 to 20 carbon atoms.

In this case, a substituent may be halogen, alkyl having 1 to 20 carbon atoms, hydrocarbyl having 1 to 20 carbon atoms, alkoxy having 1 to 20 carbon atoms or aryloxy having 6 to 20 carbon atoms.

In this case, the transition metal compound may be one or at least two transition metal compounds selected from the group consisting of the compounds represented by the following Formulae.

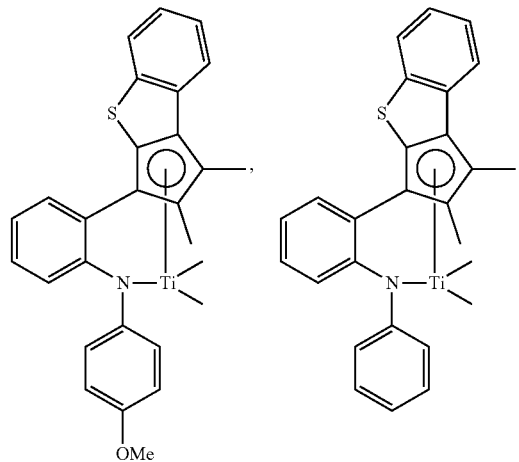

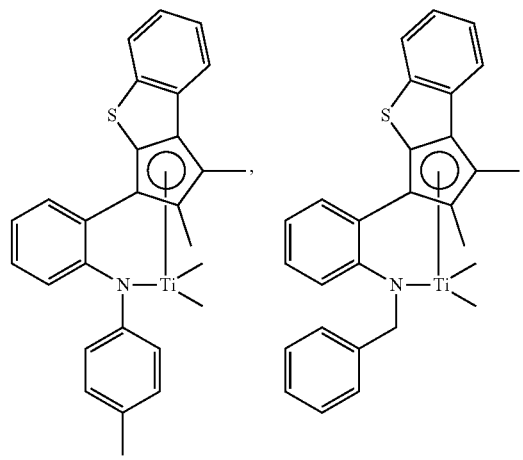

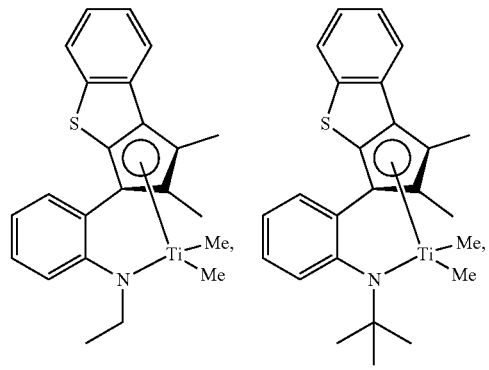

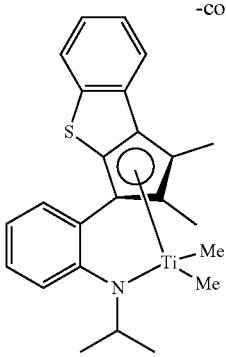

According to another embodiment of the present application, $R_{11}$ is connected to adjacent $R_{10}$ from each other to form an aliphatic ring having 5 to 20 carbon atoms or an aromatic ring having 6 to 20 carbon atoms. In addition, the aliphatic ring or the aromatic ring may be substituted with halogen, alkyl having 1 to 20 carbon atoms, alkenyl having 2 to 20 carbon atoms or aryl having 6 to 20 carbon atoms.

In this case, the transition metal compound may be represented, for example, by the following Formula 2.

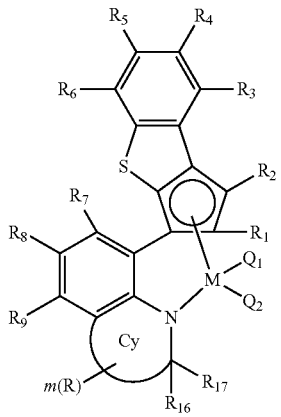

<Formula 2> in the above Formula 2,

M, $Q_1$, $Q_2$, and $R_1$ to $R_9$ are the same as defined in the above Formula 1, Cy is a five-membered or six-membered aliphatic ring, and R, $R_{16}$ and $R_{17}$ are independently hydrogen; alkyl having 1 to 20 carbon atoms; alkenyl having 2 to 20 carbon atoms; aryl having 6 to 20 carbon atoms; alkylaryl having 7 to 20 carbon atoms; or arylalkyl having 7 to 20 carbon atoms;

when Cy is the five-membered aliphatic ring, m is an integer from 0 to 2, and when Cy is the six-membered aliphatic ring, m is an integer from 0 to 4.

According to an embodiment of the present application, the transition metal compound may have stereoisomers having different steric conformation between substituents in a molecule including at least one chiral center. For example, in the compound of the above Formula 1, carbon of $R_{11}$ may be a chiral center, and a molecule including the chiral center may have a cis structure and a trans structure, having different steric conformation between substituents.

According to an embodiment of the present application, the cis isomer of the transition metal compound according to the embodiment may be represented by the following Formula 3, and the trans isomer thereof may be represented by the following Formula 4.

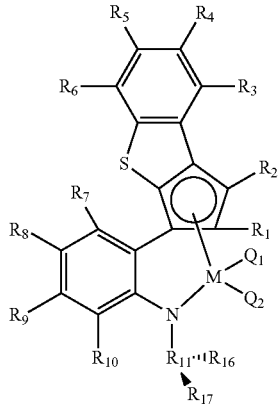

<Formula 3>

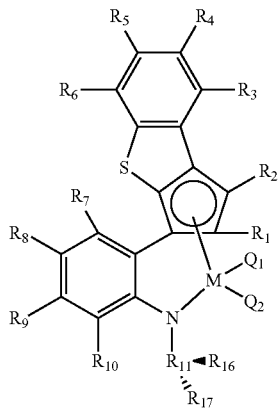

<Formula 4> in the above Formulae 3 and 4,

M, $Q_1$, $Q_2$, and $R_1$ to $R_{11}$ are the same as defined in the above Formula 1, and $R_{16}$ and $R_{17}$ are the same or different and independently hydrogen, alkyl having 1 to 20 carbon atoms; alkenyl having 2 to 20 carbon atoms; cycloalkyl having 3 to 20 carbon atoms; aryl having 6 to 20 carbon atoms; alkylaryl having 7 to 20 carbon atoms; arylalkyl having 7 to 20 carbon atoms; or heteroaryl having 2 to 20 carbon atoms.

According to another embodiment of the present application, the cis isomer (c) of the transition metal compound of the embodiment may be represented by the following Formula 5, and the trans isomer (t) thereof may be represented by the following Formula 6.

<Formula 5>

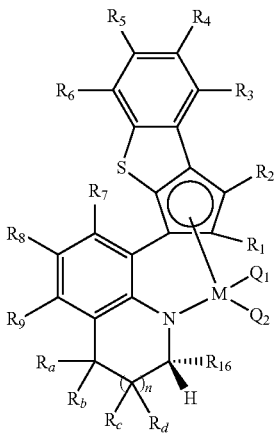

<Formula 6>

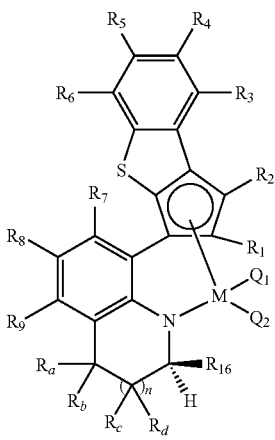

in the above Formulae 5 and 6,

M, $Q_1$, $Q_2$ and $R_1$ to $R_9$ are the same as defined in the above Formula 1, n is 0 or 1, $R_a$ to $R_d$ are the same or different and independently hydrogen; alkyl having 1 to 20 carbon atoms; alkenyl having 2 to 20 carbon atoms; aryl having 6 to 20 carbon atoms; alkylaryl having 7 to 20 carbon atoms; arylalkyl having 7 to 20 carbon atoms, where at least two of adjacent $R_a$ to $R_d$ are connected to each other to form an aliphatic ring having 5 to 20 carbon atoms or an aromatic ring having 6 to 20 carbon atoms, and the aliphatic ring or the aromatic ring may be substituted with halogen, alkyl having 1 to 20 carbon atoms, alkenyl having 2 to 20 carbon atoms, or aryl having 6 to 20 carbon atoms, and $R_{16}$ is alkyl having 1 to 20 carbon atoms; alkenyl having 2 to 20 carbon atoms; cycloalkyl having 3 to 20 carbon atoms; aryl having 6 to 20 carbon atoms; alkylaryl having 7 to 20 carbon atoms; arylalkyl having 7 to 20 carbon atoms; or heteroaryl having 2 to 20 carbon atoms.

In an embodiment of the present application, alkyl and alkenyl may be a linear or branched chain alkyl or alkenyl.

In another embodiment of the present application, silyl may be a substituted silyl with alkyl having 1 to 20 carbon atoms, for example, trimethylsilyl or triethylsilyl.

In a further another embodiment of the present application, aryl includes a single ring aryl or a polyring aryl, for example, phenyl, naphthyl, anthryl, phenanthryl, crysenyl, pyrenyl, etc.

According to a further another embodiment of the present application, $R_1$ and $R_2$ in the above Formula 1 are the same or different and are independently alkyl having 1 to 20 carbon atoms.

According to a further another embodiment of the present application, $R_1$ and $R_2$ in the above Formula 1 are the same or different and are independently alkyl having 1 to 6 carbon atoms.

According to a further another embodiment of the present application, $R_1$ and $R_2$ in the above Formula 1 are methyl.

According to a further another embodiment of the present application, $R_3$ to $R_6$ in the above Formula 1 are the same or different and independently hydrogen; alkyl having 1 to 20 carbon atoms; or alkenyl having 2 to 20 carbon atoms.

According to a further another embodiment of the present application, $R_3$ to $R_6$ in the above Formula 1 are the same or different and independently hydrogen; or alkyl having 1 to 20 carbon atoms.

According to a further another embodiment of the present application, $R_3$ to $R_6$ in the above Formula 1 are the same or different and independently hydrogen. In another embodiment, the catalyst composition comprises a R isomer (R) which is represented by the following Formula 5 and a S isomer (S) which is represented by the following Formula 6:

<Formula 5>

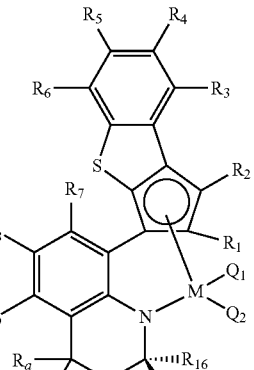

<Formula 6>

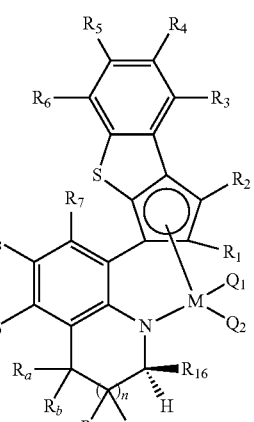

in the above Formulae 5 and 6,

M, $Q_1$, $Q_2$ and $R_1$ to $R_9$ are the same as defined in the above Formula 3 and 4, n is 0 or 1, $R_a$ to $R_d$ are the same or different and independently hydrogen; alkyl having 1 to 20 carbon atoms; alkenyl having 2 to 20 carbon atoms; aryl having 6 to 20 carbon atoms; alkylaryl having 7 to 20 carbon atoms; arylalkyl having 7 to 20 carbon atoms, where at least two of adjacent $R_a$ to $R_d$ are connected to each other to form an aliphatic ring having 5 to 20 carbon atoms or aromatic ring having 6 to 20 carbon atoms, and the aliphatic ring or the aromatic ring optionally substituted with halogen, alkyl having 1 to 20 carbon atoms, alkenyl having 2 to 20 carbon atoms, or aryl having 6 to 20 carbon atoms, and $R_{16}$ is alkyl having 1 to 20 carbon atoms; alkenyl having 2 to 20 carbon atoms; cycloalkyl having 3 to 20 carbon atoms; aryl having 6 to 20 carbon atoms; alkylaryl having 7 to 20 carbon atoms; arylalkyl having 7 to 20 carbon atoms; or heteroaryl having 2 to 20 carbon atoms.

According to a further another embodiment of the present application, in the above Formulae 5 and 6, where n is 0, $R_7$ to $R_9$ and $R_a$ to $R_d$ are the same or different and independently hydrogen; alkyl having 1 to 20 carbon atoms; or alkenyl having 2 to 20 carbon atoms.

According to a further another embodiment of the present application, in the above Formulae 5 and 6, where n is 0, $R_7$ to $R_9$ and $R_a$ to $R_d$ are the same or different and independently hydrogen; or alkyl having 1 to 20 carbon atoms.

According to a further another embodiment of the present application, in the above Formulae 5 and 6, where n is 0, $R_7$ to $R_9$ and $R_a$ to $R_d$ are hydrogen.

According to a further another embodiment of the present application, in the above Formulae 5 and 6, where n is 1, $R_7$ to $R_9$ and $R_a$ to $R_d$ are the same or different and independently hydrogen; alkyl having 1 to 20 carbon atoms; or alkenyl having 2 to 20 carbon atoms.

According to a further another embodiment of the present application, in the above Formulae 5 and 6, where n is 1, $R_7$ to $R_9$ and $R_a$ to $R_d$ are the same or different and independently hydrogen; or alkyl having 1 to 20 carbon atoms.

According to a further another embodiment of the present application, in the above Formulae 5 and 6, where n is 1, $R_7$ to $R_9$ and $R_a$ to $R_d$ are hydrogen.

According to a further another embodiment of the present application, in the above Formulae 5 and 6, $R_{16}$ is alkyl having 1 to 20 carbon atoms.

According to a further another embodiment of the present application, in the above Formulae 5 and 6, $R_{16}$ is alkyl having 1 to 6 carbon atoms.

According to a further another embodiment of the present application, in the above Formulae 5 and 6, $R_{16}$ is methyl; or n-butyl.

According to a further another embodiment of the present application, M in the above Formula 1 is Ti, Hf or Zr.

In the present application, the catalyst composition is characterized in that a metal site is connected to a cyclopentadienyl ligand connected to a phenylene bridge introducing an amido group, and the structure thereof has a narrow Cp-M-N angle and a wide $Q_1$-M-$Q_2$ angle to which a monomer may approach.

In addition, different from a CGC structure connected by a silicon bridge, the sites of cyclopentadiene fused with benzothiophene via the bonding of a ring shape, the phenylene bridge, nitrogen and the metal are connected in order to form a stable and rigid pentagonal ring structure in the compound structure represented by the above Formula 1.

In addition, since an isomer mixture has different stereoselectivity, when applying the isomer mixture for the polymerization of an olefin after reacting with a cocatalyst such as methyl aluminoxane or $B(C_6F_5)_3$ and activating, polyolefin having high activity, high molecular weight and high copolymerization degree may be produced even at a high polymerization temperature.

Particularly, since a large amount of alpha-olefin may be introduced as well as linear polyethylene having a low density of 0.910-0.930 g/cc due to the structural characteristics of the catalyst, a polyolefin copolymer having extremely low density of less than 0.910 g/cc may be produced.

In particular, a polymer having narrow MWD, good copolymerization degree and high molecular weight in a low density region may be prepared by using a catalyst composition including the isomer mixture. In addition, diverse substituents may be introduced in a cyclopentadienyl group fused with benzothiophene and quinoline, and electronic and steric environment around a metal may be easily controlled, and so, the structure and physical properties of the polyolefin thus produced may be controlled.

The catalyst composition may be preferably used for preparing a catalyst for polymerizing an olefin monomer, however the present invention is not limited thereto. The transition metal compound may be used in any other applicable fields.

According to an embodiment of the present application, the catalyst composition of the above Formula 1 may be prepared by the following steps of a) to d):

a) a step of preparing a compound represented by the following Formula 8 by performing a reaction of an amine compound represented by the following Formula 7 with an alkyl lithium and adding a compound including a protecting group (—$R_0$);

b) a step of preparing an amine compound represented by the following Formula 10 by performing a reaction of the compound represented by the following Formula 8 with an alkyl lithium and adding a ketone compound represented by the following Formula 9;

c) a step of preparing a dilithium compound represented by the following Formula 11 by performing a reaction of a compound represented by the above Formula 10 with n-butyllithium; and d) a step of preparing a catalyst composition represented by Formula 1 by performing a reaction of a compound represented by the following Formula 11 with $MCl_4$ (M=transition metal in group 4) and an organ lithium compound.

<Formula 7>

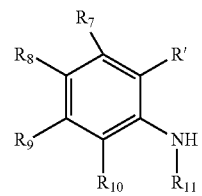

<Formula 8>

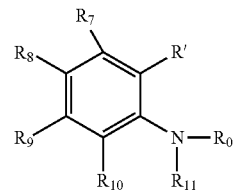

-continued

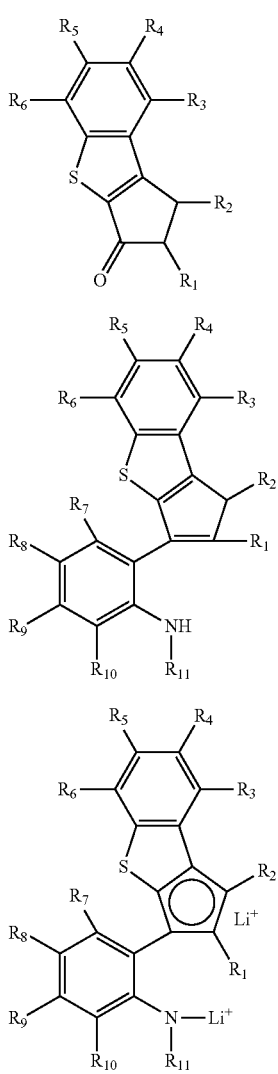

<Formula 9>
<Formula 10>
<Formula 11> in the above Formulae 7 to 11,
R' is hydrogen,
$R_0$ is a protecting group, and
other substituents are the same as defined in Formula 1.

In the above step a), the compound including the protecting group may be selected from trimethylsilyl chloride, benzyl chloride, t-butoxycarbonyl chloride, benzyloxycarbonyl chloride and carbon dioxide.

When the compound including the protecting group is the carbon dioxide, the above Formula 8 may be a lithium carbamate compound represented by the following Formula 8a.

<Formula 8a>

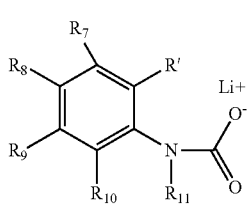

The substituents are the same as defined in Formula 1.

According to a particular embodiment, the compound of Formula 1 may be prepared by the following Reaction 1.

<Reaction 1>

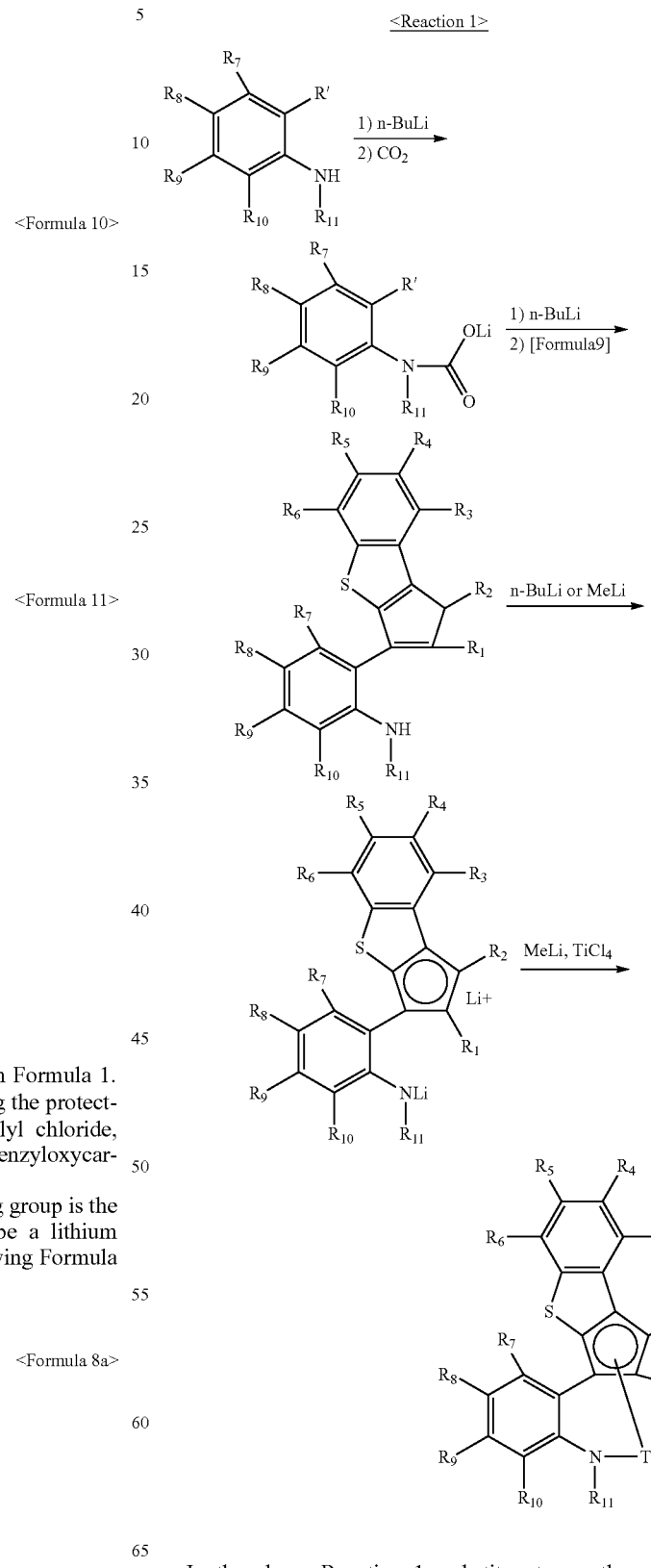

In the above Reaction 1, substituents are the same as defined above.

The present application also provides a catalyst composition including the compound of the above Formula 1.

The catalyst composition may further include a cocatalyst. Known materials in this field may be used as the cocatalyst.

For example, the catalyst composition may further include at least one of the following Formulae 12 to 14 as the cocatalyst.

$$—[Al(R_{18})—O]_a—$$ <Formula 12>

In the above Formula, each $R_{18}$ is independently a halogen radical; a hydrocarbyl radical having 1 to 20 carbon atoms; or a hydrocarbyl radical substituted with halogen and having 1 to 20 carbon atoms, and a is an integer greater than or equal to 2.

$$D(R_{18})_3$$ <Formula 13>

In the above Formula, D is aluminum or boron, and $R_{18}$ is the same as in the above Formula 12.

$$[L-H]^+[Z(A)_4]^- \text{ or } [L]^+[Z(A)_4]^-$$ <Formula 14>

In the above Formula, L is a neutral or cationic Lewis acid, H is a hydrogen atom, Z is an element in group 13, and A is independently aryl having 6 to 20 carbon atoms or alkyl having 1 to 20 carbon atoms, where at least one hydrogen atom may be substituted with a substituent, and the substituent is halogen, hydrocarbyl having 1 to 20 carbon atoms, alkoxy having 1 to 20 carbon atoms, or aryloxy having 6 to 20 carbon atoms.

According to an embodiment of the present application, first, a method including a step of obtaining a mixture by contacting the catalyst composition with a compound represented by the above Formula 12 or Formula 13; and a step of adding a compound represented by the above Formula 14 into the mixture is provided as the method of preparing the catalyst composition.

Second, a method of preparing a catalyst composition by contacting the catalyst composition with the compound represented by the above Formula 14 is provided.

According to another embodiment of the present application, in the first method among the preparing methods of the catalyst composition according to the above embodiment, the molar ratio of the compound represented by the above Formula 12 or Formula 13 with respect to the catalyst composition may preferably be from 1:2 to 1:5,000, may more preferably be from 1:10 to 1:1,000, and may most preferably be from 1:20 to 1:500.

Meanwhile, the molar ratio of the compound represented by the above Formula 14 with respect to the catalyst composition may preferably be from 1:1 to 1:25, may more preferably be from 1:1 to 1:10, and may most preferably be from 1:1 to 1:5.

In the case that the molar ratio of the compound represented by the above Formula 12 or Formula 13 with respect to the catalyst composition is less than 1:2, the amount of an alkylating agent is very small, and the alkylation of a metal compound may not be completely carried out, and when the molar ratio exceeds 1:5,000, the activation of the alkylated metal compound may not be completely carried out due to the side reaction of the remaining excessive alkylating agent with the activation agent of the above Formula 14 even though the alkylation of the metal compound may be carried out.

In addition, in the case that the molar ratio of the compound represented by the above Formula 14 with respect to the transition metal compound of the above Formula 1 is less than 1:1, the amount of the activation agent is relatively small, and the activation of the metal compound may not be completely carried out, thereby deteriorating the activity of the catalyst composition prepared. In the case that the molar ratio exceeds 1:25, the remaining excessive amount of the activation agent may decrease the economic performance in consideration of the unit price of the catalyst composition, or the purity of a polymer thus produced may be decreased even though the activation of the metal compound may be completely carried out.

According to another embodiment of the present application, in the second method among the preparing methods of the catalyst composition according to the above embodiment, the molar ratio of the compound represented by the above Formula 14 with respect to the catalyst composition may preferably be from 1:1 to 1:500, may more preferably be from 1:1 to 1:50, and may most preferably be from 1:2 to 1:25. In the case that the molar ratio is less than 1:1, the amount of the activation agent is relatively small, and the activation of the metal compound may not be completely carried out, thereby deteriorating the activity of the catalyst composition prepared. In the case that the molar ratio exceeds 1:500, the remaining excessive amount of the activation agent may decrease the economic performance in consideration of the unit price of the catalyst composition, or the purity of a polymer thus produced may be decreased even though the activation of the metal compound may be completely carried out.

According to another embodiment of the present application, a hydrocarbon solvent such as pentane, hexane, heptane, etc., or an aromatic solvent such as benzene, toluene, etc. may be used as a reaction solvent during the preparation of the catalyst composition. However, the solvent is not limited thereto, and all solvents useful in this field may be used.

In addition, the composition may further include an additive. For example, the composition may include a compound containing a hetero atom. Particularly, the compound containing a hetero atom may include a heterocyclic compound; or an alkane containing a hetero atom.

Examples of the heterocyclic compound may include an aromatic ring containing a hetero atom; a heterocycloalkane; or a heterocycloalkene.

Examples of the alkane containing a hetero atom may include an alkane including an amine group or an ether group.

The heteroaromatic ring; the heterocycloalkane; or the heterocycloalkene may include a five membered or six membered ring.

The compound containing a hetero atom may include O, S, Se, N, P or Si as the hetero atom.

The compound containing a hetero atom may include one hetero atom.

The compound containing a hetero atom may be substituted, and in the case that the compound containing a hetero atom is substituted, the compound may be substituted with at least one selected from the group consisting of hydrogen, methyl, phenyl and benzyl.

Examples of the compound containing a hetero atom may include at least one selected from the group consisting of pyridine, 3,5-dimethylpyridine, 2,4,6-trimethylpyridine, 2,6-dimethylpyridine, 2,4-dimethylpyridine, thiophene, 2-methylthiophene, 2,3-dimethylthiophene, piperidine, phosphinine, pyrrole, 2-methylpyrrole, aniline, p-toluidine, tetrahydrofuran, 2,3-dimethyltetrahydrofuran, 2,5-tetrahydrofuran, 3,4-dihydro-2H-pyrene, furan, 2-methylfuran, 2,3-dimethylfuran, 2,5-dimethylfuran, diethyl ether, methyl t-butyl ether and triethylamine, without limitation.

In addition, the catalyst composition and the cocatalyst may be used as a supported state on a support. As the support, silica or alumina may be used.

According to another embodiment of the present application, the compound represented by the above Formula 12 may be any alkylaluminoxane, without specific limitation. Preferably, methylaluminoxane, ethylaluminoxane, isobutylaluminoxane, butylaluminoxane, etc. may be used, and methylaluminoxane may be particularly preferably used.

According to another embodiment of the present application, the compound represented by the above Formula 13 is not specifically limited and may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc. Particularly, the compound may preferably be selected from trimethylaluminum, triethylaluminum and triisobutylaluminum.

According to another embodiment of the present application, the compound represented by the above Formula 14 is not specifically limited and may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, triethylammoniumtetraphenylaluminum, tributylammoniumtetraphenylaluminum, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, triphenylcarboniumtetra(p-trifluoromethylphenyl)boron, triphenylcarboniumtetrapentafluorophenylboron, etc.

According to an embodiment of the present application, the preparation of a polyolefin homopolymer or a copolymer may be performed by contacting the catalyst composition; and a catalyst composition including at least one compound selected from compounds represented by Formulae 12 to 14 with at least one olefin monomer.

According to another embodiment of the present application, the most preferred preparation process using the catalyst composition is a solution process, and a slurry process or a gas process may be applicable when the composition is used together with an inorganic support such as silica.

According to another embodiment of the present application, the activating catalyst composition may be inserted during the preparation process after being dissolved or diluted in an aliphatic hydrocarbon solvent having 5 to 12 carbon atoms such as pentane, hexane, heptane, nonane, decane and an isomer thereof, an aromatic hydrocarbon solvent such as toluene and benzene, or a hydrocarbon solvent substituted with a chlorine atom such as dichloromethane and chlorobenzene, so as to be applicable for an olefin polymerization process. The solvent used may preferably be treated with a small amount of alkylaluminum to remove a trace amount of water or air functioning as a catalytic poison, and a cocatalyst may be further included.

According to another embodiment of the present application, an olefin monomer polymerizable using the metal compounds and the cocatalyst may include ethylene, alpha-olefin, cyclic olefin, etc., and a diene olefin monomer or a triene olefin monomer having at least two double bonds may be also polymerized. Particular examples of the monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, 3-chloromethylstyrene, etc., and at least two monomers thereof may be copolymerized.

Particularly, in the preparation method of the present invention using the catalyst composition, a copolymer with ultra low density having high molecular weight and polymer density of less than or equal to 0.91 g/cc may be prepared by a copolymerization reaction of ethylene and a monomer having high steric hindrance such as 1-octene at a high reaction temperature of greater than or equal to 90° C.

According to an embodiment of the present invention, the density of the polymer prepared by the preparation method of the present invention is less than 0.91 g/cc.

According to an embodiment of the present invention, the density of the polymer prepared by the preparation method of the present invention is less than 0.89 g/cc.

According to an embodiment of the present invention, the density of the polymer prepared by the preparation method of the present invention is less than or equal to 0.885 g/cc.

According to an embodiment of the present invention, the Tc of the polymer prepared by the preparation method of the present invention is less than or equal to 75° C.

According to an embodiment of the present invention, the Tm of the polymer prepared by the preparation method of the present invention is less than or equal to 95° C.

According to an embodiment of the present invention, the Tm of the polymer prepared by the preparation method of the present invention is less than or equal to 91° C.

According to an embodiment of the present invention, the Tm of the polymer prepared by the preparation method of the present invention is less than or equal to 87° C.

According to an embodiment of the present invention, the Mw of the polymer prepared by the preparation method of the present invention is greater than or equal to 40,000.

According to an embodiment of the present invention, the Mw of the polymer prepared by the preparation method of the present invention is 40,000 to 1,000,000, preferably, 40,000 to 300,000, more preferably, 80,000 to 300,000, and most preferably, 80,000 to 100,000.

According to an embodiment of the present invention, the MWD of the polymer prepared by the preparation method of the present invention is less than or equal to 3.

According to an embodiment of the present invention, the MWD of the polymer prepared by the preparation method of the present invention is 1 to 3.

According to an embodiment of the present invention, the MWD of the polymer prepared by the preparation method of the present invention is 1.5 to 2.9.

According to an embodiment of the present invention, the MWD of the polymer prepared by the preparation method of the present invention is 2 to 2.85.

According to an embodiment of the present invention, the polymer according to the present invention has MWD of 1 to 3, Mw of 40,000 to 300,000, and density of less than 0.91 g/cc.

Hereinafter, the present invention will be explained in particular with reference to the following examples. However, the following examples are illustrated to assist the understanding of the present invention, and the scope of the present invention is not limited thereto.

MODE FOR CARRYING OUT THE INVENTION

Synthesis of Ligand and Transition Metal Compound

Organic reagents and solvents were purchased from Aldrich Co. and purified by a standard method unless otherwise specifically stated. In all synthetic steps, the contact of the air and moisture were blocked to improve the reproducibility of experiments. In the ketone compounds of Formula 9, a compound where $R_1$ is methyl was synthesized by a method disclosed in a document [*Organometallics* 2002, 21, 2842-2855]. In addition, for the identification of synthesized compounds, spectrums were obtained by using 500 MHZ nuclear magnetic resonance (NMR).

Example 1

Synthesis of Compound 1

A 8-(1,2-dimethyl-1H-benzo[b]cyclopenta[d]thiophen-3-yl)-2-methyl-1,2,3,4-tetrahydroquinolin-titanium dimethyl compound 1 g (3.04 mmol) of a (([(1,2,3,4-tetrahydroquinolin-8-yl)]tetramethylcyclopentadienyl-eta5,kappa-N)titanium dimethyl) complex was dissolved in 40 mL of a methyl-tertiary-butyl ether solvent, and a solution obtained by dissolving 180 mg (1.52 mmol) of 1,6-hexanediol in 20 mL of methyl-tertiary-butyl ether was slowly added thereto drop by drop at –20° C. The temperature of an orange solution was slowly elevated, followed by stirring for 36 hours. 40 mL of the methyl-tertiary butyl ether solvent was removed, and 30 mL of n-hexane was added. The product thus obtained was filtered to obtain an orange solid compound (yield 1.0 g, >95%).

2.1 eq. of nBuLi was slowly added drop by drop to 0.5 g (1.445 mmol) of the ligand. The temperature was slowed elevated, and an additive for increasing the solubility of the ligand was added. Then, 1.0 eq. of $TiCl_4DME$ was added drop by drop, followed by stirring at room temperature. After removing the solvent, the product was extracted with toluene to obtain a red solid of an isomer mixture (yield 700 mg, 52%).

$^1$H NMR ($CDCl_3$) mixture of two isomers: δ ~7.1 (d, 1H, Ar—H), 6.84 (t, 1H, J=7.5 Hz, Ar—H), 6.83 (t, 1H, J=7.5 Hz, Ar—H), 6.98 (d, 1H, Ar—H), 2.6-2.7 (m, 2H, piperidine-$CH_2$), 2.3-2.4 (m, 2H, piperidine-$CH_2$), 1.63-1.69 (m, 2H, piperidine-$CH_2$), 1.50-1.55 (m, 2H, piperidine-$CH_2$), 1.71-1.80 (m, 2H, piperidine-$CH_2$), 1.56-1.61 (m, 2H, piperidine-$CH_2$), 5.42 (m, 1H, piperidine-CH), 1.15 (d, 3H, J=6.5 Hz, piperidine-$CH_3$), 1.13 (d, 3H, J=6.5 Hz, piperidine-$CH_3$), 7.84 (d, 1H, J=8 Hz, Ar—H), 7.83 (d, 1H, J=8 Hz, Ar—H), ~7.2 (t, 1H, Ar—H), 6.96 (t, 1H, Ar—H), 7.23 (d, 1H, J=8 Hz, Ar—H), 7.25 (d, 1H, J=8 Hz, Ar—H), 2.38 (s, 3H, Cp-$CH_3$), 2.41 (s, 3H, Cp-$CH_3$), 1.72 (s, 3H, Cp-$CH_3$), 1.64 (s, 3H, Cp-$CH_3$), 0.68 (s, 3H, Ti—$CH_3$), 0.73 (s, 3H, Ti—$Cl_3$), 0.18 (s, 3H, Ti—$CH_3$), 0.05 (s, 3H, Ti—$CH_3$) ppm <Preparation of Polymer>

To a 2 L autoclave reactor, a hexane solvent (1.0 L) and 1-octene (0.44 M) were added, and the temperature of the reactor was pre-heated to 120° C. At the same time, the pressure of the reactor was set by filling with ethylene (35 bar) in advance. Compound 1 (1.0 μmol) treated with a triisobutylaluminum compound, and a dimethylanilinium tetrakis(pentafluorophenyl)borate cocatalyst (10 μmol) were added one by one in the reactor while applying a high argon pressure. Then, copolymerization reaction was performed for minutes. After that, a remaining ethylene gas was exhausted out, and a polymer solution was added to excessive amount of ethanol to induce precipitation. The precipitated polymer was washed with ethanol and acetone twice and three times, respectively, and was dried in a vacuum oven at 80° C. for at least 12 hours. Then, physical properties thereof were measured.

Example 2

A 8-(1,2-dimethyl-1H-benzo[b]cyclopenta[d]thiophen-3-yl)-2-methyl-1,2,3,4-tetrahydroquinoline compound nBuLi (14.9 mmol, 1.1 eq) was slowly added drop by drop to a solution of 2-methyl-1,2,3,4-tetrahydroquinoline (2 g, 13.6 mmol) dissolved in 10 mL of ether at –40° C. The temperature was slowly elevated to room temperature, and the reaction mixture was stirred at room temperature for 4 hours. The temperature was lowered to –40° C. again and $CO_2(g)$ was inserted, and the reaction was maintained for 0.5 hours at a low temperature. The temperature was slowly elevated, and remaining $CO_2(g)$ was removed via a bubbler. THF (17.6 mmol, 1.4 ml) and tBuLi (10.4 mmol, 1.3 eq) were inserted in the reaction mixture at –20° C., following by aging at a low temperature at –20° C. for 2 hours. The ketone (1.9 g, 8.8 mmol) was dissolved in diethyl ether and slowly added drop by drop to the reaction mixture. After stirring at room temperature for 12 hours, 10 mL of water was inserted and hydrochloric acid (2N, 60 mL) was added in the reactant, followed by stirring for 2 minutes. Organic solvents were extracted and the reactant was neutralized with a NaHCO3 aqueous solution. Then, the organic solvent was extracted and dried with MgSO$_4$. Through silica gel column chromatography, a yellow oil (1.83 g, 60% yield) was obtained.

$^1$H NMR (C$_6$D$_6$): δ 1.30 (s, 3H, CH$_3$), 1.35 (s, 3H, CH$_3$), 1.89-1.63 (m, 3H, Cp-H quinoline-CH$_2$), 2.62-2.60 (m, 2H, quinoline-CH$_2$), 2.61-2.59 (m, 2H, quinoline-NCH$_2$), 2.70-2.57 (d, 2H, quinoline-NCH$_2$), 3.15-3.07 (d, 2H, quinoline-NCH$_2$), 3.92 (broad, 1H, N—H), 6.79-6.76 (t, 1H, aromatic), 7.00-6.99 (m, 2H, aromatic), 7.30-7.23 (m, 2H, aromatic), 7.54-7.53 (m, 1H, aromatic), 7.62-7.60 (m, 1H, aromatic) ppm A 8-(1,2-dimethyl-1H-benzo[b]cyclopenta[d]thiophen-3-yl)-2-methyl-1,2,3,4-tetrahydroquinoline-titanium dichloride compound nBuLi (3.0 mmol, 2.1 eq) was slowly added drop by drop to the ligand (1.0 g, 2.89 mmol) at −20° C. The formation of a yellow slurry was observed, and the temperature was slowly elevated to room temperature, followed by stirring at room temperature for 12 hours. TiCl$_4$DME (806 mg, 2.89 mmol, 1.0 eq) was added drop by drop, followed by stirring at room temperature for 12 hours. After removing solvents, the reactant was extracted with toluene to obtain a red solid (700 mg, 52% yield).

$^1$H NMR (C$_6$D$_6$): mixture of two isomers; δ 1.46-1.467 (t, 2H, quinoline-NCH$_2$), 1.85 (s, 3H, Cp-CH$_3$), 1.79 (s, 3H, Cp-CH$_3$), 2.39 (s, 3H, Cp-CH$_3$), 2.37 (s, 3H, Cp-CH$_3$), 2.10-2.07 (t, 2H, quinoline-NCH$_2$), 5.22-5.20 (m, 1H, N—CH), 5.26-5.24 (m, 1H, N—CH), 6.89-6.87 (m, 2H, aromatic) 6.99-6.95 (m, 1H, aromatic), 7.19-7.08 (m, 2H, aromatic), 7.73-7.68 (m, 1H, aromatic) ppm <Preparation of Polymer>

A polymer was prepared by the same procedure described in the above Example 1 except for using Compound 2 instead of Compound 1 and using the amount of 1-octene shown in the following Table 1.

Example 3

A polymer was prepared by the same procedure described in the above Example 1 except for using Compound 2 instead of Compound 1 and using the amount of 1-octene shown in the following Table 1.

Comparative Example 4

A polymer was prepared by the same procedure described in the above Example 1 except for using the following Compound A instead of Compound 1.

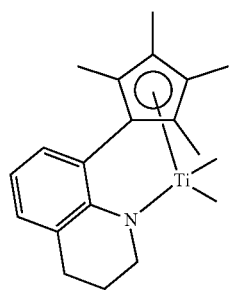

<Compound A>

Evaluation of Physical Properties (Weight, Activity, Melting Index, Melting Point, Density)

The melt index (I$_2$) of a polymer was measured according to ASTM D-1238 (condition E, 190° C., 2.16 kg load). The melting point (Tm) of the polymer was obtained by using a differential scanning calorimeter 2920 (DSC) manufactured by TA Co. That is, the temperature was elevated to 200° C., maintained for 5 minutes, decreased to 30° C. and elevated again, and the apex of a DSC curve was measured as the melting point. In this case, the elevating rate and the decreasing rate of the temperature was 10° C./min, and the melting point was obtained during the second elevation of the temperature. In addition, the density of the polymer was measured by manufacturing a sheet having a thickness of 3 mm and a radius of 2 cm by using a press mold at 180° C. of a sample treated with an antioxidant (1,000 ppm), cooling at a rate of 10° C./min, and measuring using a Mettler balance.

The physical properties of the polymers prepared in the above Examples 1 to 3 and Comparative Example 1 are illustrated in the following Table 1.

TABLE 1

| | Catalyst | 1-octene (M) | Activity (kg/mmolTi) | I$_2$ | Density (g/ml) |
|---|---|---|---|---|---|
| Comparative Example 1 | Compound A | 0.44 | 75 | 2.56 | 0.862 |
| Example 1 | Compound 1 | 0.44 | 76 | 1.12 | 0.862 |
| Example 2 | Compound 2 | 1.1 | 35 | 0.018 | 0.875 |
| Example 3 | Compound 2 | 1.47 | 38 | 0.085 | 0.870 |

Polymerization conditions: hexane (1.0 L), ethylene (35 bar), 120° C., Cocat AB 10 eq., time (8 minutes)
I$_2$: melting index, Tm: melting point As shown in the above Table 1, Example 1 of the present invention exhibited higher catalyst activity under the same density level and has lower melting index by more than twice.

In addition, with respect to Examples 2 and 3, the activity was decreased to about half, and the melting index was lower by 30 to 100 times when compared to those of Comparative Example 1. Thus, a polymer having higher molecular weight than Comparative Example 1 may be prepared.

With respect to Examples 1 and 2, the melting index was markedly decreased, and the density was increased to deteriorate copolymerization properties when using Compound 2, when compared to those of Example 1 using Compound 1. However, the same level of the activity was maintained, and the density was increased to 0.870 level by increasing the amount added of 1-octene in Example 3.

To summarize the results, the melting index may be slightly decreased with the same level of density when using Compound 1, and the density may be slightly increased and a polymer having high molecular weight may be synthesized when using Compound 2. Thus, by selectively using Compound 1 and Compound 2, different polymers may be synthesized.

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. A catalyst composition comprising:
a transition metal compound represented by the following Formula 2,

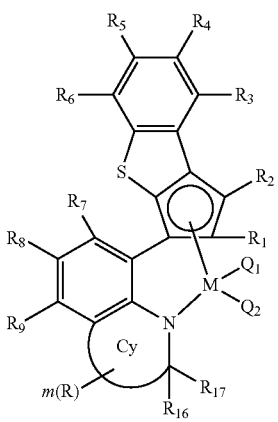

Formula 2

M is a transition metal in group 4, $Q_1$ and $Q_2$ are the same or different and independently hydrogen; halogen; alkyl having 1 to 20 carbon atoms; alkenyl having 2 to 20 carbon atoms; aryl having 6 to 20 carbon atoms; alkylaryl having 6 to 20 carbon atoms; arylalkyl having 7 to 20 carbon atoms; alkyl amido having 1 to 20 carbon atoms; aryl amido having 6 to 20 carbon atoms; or alkylidene having 1 to 20 carbon atoms, $R_1$ to $R_6$ are the same or different and independently hydrogen; silyl; alkyl having 1 to 20 carbon atoms; alkenyl having 2 to 20 carbon atoms; aryl having 6 to 20 carbon atoms; alkylaryl having 7 to 20 carbon atoms; arylalkyl having 7 to 20 carbon atoms; or a metalloid radical of a metal in group 14 substituted with hydrocarbyl having 1 to 20 carbon atoms; $R_1$ and $R_2$ optionally connected from each other, or at least two of $R_3$ to $R_6$ optionally connected to each other to form an aliphatic ring having 5 to 20 carbon atoms or an aromatic ring having 6 to 20 carbon atoms; the aliphatic ring or the aromatic ring optionally substituted with halogen, alkyl having 1 to 20 carbon atoms, alkenyl having 2 to 20 carbon atoms or aryl having 6 to 20 carbon atoms, $R_7$ to $R_{10}$ are the same or different and independently hydrogen; alkyl having 1 to 20 carbon atoms; alkenyl having 2 to 20 carbon atoms; aryl having 6 to 20 carbon atoms; alkylaryl having 7 to 20 carbon atoms; or arylalkyl having 7 to 20 carbon atoms; at least two adjacent to each other of $R_7$ to $R_{10}$ optionally connected to each other to form an aliphatic ring having 5 to 20 carbon atoms or an aromatic ring having 6 to 20 carbon atoms; the aliphatic ring or the aromatic ring optionally substituted with halogen, alkyl having 1 to 20 carbon atoms, alkenyl having 2 to 20 carbon atoms or aryl having 6 to 20 carbon atoms, Cy represents a 5-membered or a 6-membered ring, m is an integer from 0 to 2, $R_{16}$ and $R_{17}$ are different and independently hydrogen, alkyl having 1 to 20 carbon atoms; alkenyl having 2 to 20 carbon atoms; cycloalkyl having 3 to 20 carbon atoms; aryl having 6 to 20 carbon atoms; alkylaryl having 7 to 20 carbon atoms; arylalkyl having 7 to 20 carbon atoms; or heteroaryl having 2 to 20 carbon atoms, wherein the carbon to which $R_{16}$ and $R_{17}$ are attached is a chiral center in R form and S form, and wherein the R form (R) and the S form (S) of the transition metal compound are present in an amount range by weight (R:S) of 1-99:99-1.

2. The catalyst composition of claim 1, wherein the R isomer (R) is represented by the following Formula 5 and the S isomer (S) is represented by the following Formula 6:

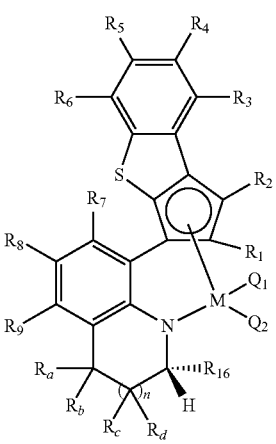

<Formula 5>

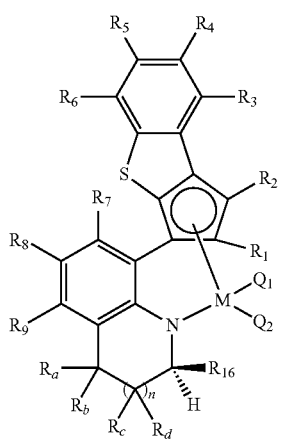

<Formula 6> in the above Formulae 5 and 6,

M, $Q_1$, $Q_2$ and $R_1$ to $R_9$ are the same as defined in the above Formula 3 and 4, n is 0 or 1, $R_a$ to $R_d$ are the same or different and independently hydrogen; alkyl having 1 to 20 carbon atoms; alkenyl having 2 to 20 carbon atoms; aryl having 6 to 20 carbon atoms; alkylaryl having 7 to 20 carbon atoms; arylalkyl having 7 to 20 carbon atoms, where at least two of adjacent $R_a$ to $R_d$ are connected to each other to form an aliphatic ring having 5 to 20 carbon atoms or aromatic ring having 6 to 20 carbon atoms, and the aliphatic ring or the aromatic ring optionally substituted with halogen, alkyl having 1 to 20 carbon atoms, alkenyl having 2 to 20 carbon atoms, or aryl having 6 to 20 carbon atoms, and $R_{16}$ is alkyl having 1 to 20 carbon atoms; alkenyl having 2 to 20 carbon atoms; cycloalkyl having 3 to 20 carbon atoms; aryl having 6 to 20 carbon atoms; alkylaryl having 7 to 20 carbon atoms; arylalkyl having 7 to 20 carbon atoms; or heteroaryl having 2 to 20 carbon atoms.

3. The catalyst composition of claim 1, wherein $R_1$ and $R_2$ are alkyl having 1 to 20 carbon atoms.

4. The catalyst composition of claim 1, wherein M is Ti, Hf or Zr.

5. The catalyst composition of claim 1, wherein the catalyst composition further comprises at least one kind of a cocatalyst.

6. The catalyst composition of claim 5, wherein the cocatalyst comprises at least one selected from the following Formulae 12 to 14:

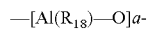  <Formula 12> in the above Formula, $R_{18}$ is independently a halogen radical; a hydrocarbyl radical having 1 to 20 carbon atoms; or a hydrocarbyl radical having 1 to 20 carbon atoms substituted with halogen, and a is an integer greater than or equal to 2,

  <Formula 13> in the above Formula, D is aluminum or boron, and $R_{18}$ is the same as in the above Formula 12,

[L-H]$^+$[Z(A)$_4$]$^-$ or [L]$^+$[Z(A)$_4$]$^-$  <Formula 14> in the above Formula, L is a neutral or cationic Lewis acid, H is a hydrogen atom, Z is an element in group 13, and A is independently aryl having 6 to 20 carbon atoms or alkyl having 1 to 20 carbon atoms, where at least one hydrogen atom optionally substituted with a substituent, and the substituent is halogen, hydrocarbyl having 1 to 20 carbon atoms, alkoxy having 1 to 20 carbon atoms, or aryloxy having 6 to 20 carbon atoms.

7. The catalyst composition of claim 1, further comprising a reaction solvent.

8. The catalyst composition of claim 1, further comprising an additive.

9. A supported catalyst in which the catalyst composition according to claim 1 is supported on a support.

10. A method of preparing a polymer using the catalyst composition according to claim 1.

11. The method of claim 10, wherein the polymer is a homopolymer or a copolymer of an olefin.

12. A method of preparing a polymer using the supported catalyst according to claim 9.

13. The method of claim 12, wherein the polymer is a homopolymer or a copolymer of an olefin.

* * * * *